(12) United States Patent
Bui et al.

(10) Patent No.: US 10,055,403 B2
(45) Date of Patent: Aug. 21, 2018

(54) RULE-BASED DIALOG STATE TRACKING

(71) Applicant: ADOBE SYSTEMS INCORPORATED, San Jose, CA (US)

(72) Inventors: Trung Huu Bui, San Jose, CA (US); Hung Hai Bui, Sunnyvale, CA (US); Franck Dernoncourt, Cambridge, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/017,305

(22) Filed: Feb. 5, 2016

(65) Prior Publication Data

US 2017/0228366 A1 Aug. 10, 2017

(51) Int. Cl.
*G06F 17/27* (2006.01)
*G10L 15/22* (2006.01)

(52) U.S. Cl.
CPC .......... *G06F 17/279* (2013.01); *G06F 17/277* (2013.01); *G06F 17/2795* (2013.01); *G10L 15/22* (2013.01)

(58) Field of Classification Search
USPC ................................. 704/7–10, 257
See application file for complete search history.

(56) References Cited

U.S. PATENT DOCUMENTS

| | | | |
|---|---|---|---|
| 7,127,398 B1 * | 10/2006 | Yamagishi ............... | G10L 15/22 704/231 |
| 7,174,300 B2 * | 2/2007 | Bush ....................... | G10L 15/22 704/270 |
| 9,348,816 B2 * | 5/2016 | Gupta .................... | G06F 17/279 |
| 2003/0110028 A1 * | 6/2003 | Bush ....................... | G10L 15/22 704/231 |
| 2010/0049517 A1 * | 2/2010 | Huang .................. | G06F 17/279 704/251 |
| 2010/0217592 A1 * | 8/2010 | Gupta .................... | G06F 17/279 704/236 |

(Continued)

OTHER PUBLICATIONS

Williams, J., Raux, A., Ramachandran, D., & Black, A. (2013). The dialog state tracking challenge. In Proceedings of the SIGDIAL 2013 Conference (pp. 404-413).

(Continued)

*Primary Examiner* — Leonard Saint Cyr
(74) *Attorney, Agent, or Firm* — Shook, Hardy & Bacon, L.L.P.

(57) ABSTRACT

The present disclosure relates dialog states, which computers use to internally represent what users have in mind in dialog. A dialog state tracker employs various rules that enhance the ability of computers to correctly identify the presence of slot-value pairs, which make up dialog states, in utterances or conversational input of dialog. Some rules provide for identifying synonyms of values of slot-values pairs in utterances. Other rules provide for identifying slot-value pairs based on coreferences between utterances and previous utterances of dialog sessions. Rules are also provided for carrying over slot-value pairs from dialog states of previous utterances to a dialog state of a current utterance. Yet other rules provide for removing slot-value pairs from candidate dialog states, which are later used as dialog states of utterances.

19 Claims, 10 Drawing Sheets

(56) References Cited

U.S. PATENT DOCUMENTS

| | | | | |
|---|---|---|---|---|
| 2011/0191109 A1* | 8/2011 | Harma | ............... | G10L 25/48 |
| | | | | 704/275 |
| 2014/0207462 A1* | 7/2014 | Bangalore | ............ | G06F 17/27 |
| | | | | 704/260 |
| 2014/0244686 A1* | 8/2014 | Tran | ............ | G10L 15/22 |
| | | | | 707/775 |
| 2014/0337370 A1* | 11/2014 | Aravamudan | ............ | G10L 25/54 |
| | | | | 707/759 |
| 2015/0019227 A1* | 1/2015 | Anandarajah | ............ | G10L 15/22 |
| | | | | 704/257 |

OTHER PUBLICATIONS

Henderson, M., Thomson, B., & Williams, J. D. (Jun. 2014). The Second Dialog State Tracking Challenge. In SIGDIAL Conference (pp. 263-272).

Henderson, M., Thomson, B., & Williams, J. D. (Dec. 2014). The third dialog state tracking challenge. In Spoken Language Technology Workshop (SLT), 2014 IEEE (pp. 324-329). IEEE.

DSTC4: Fourth Dialog State Tracking Challenge. Workshop held Jan. 13-16, 2016 at IWSDS 2016. Information available online at <http://www.colips.org/workshop/dstc4/index.html>.

Dernoncourt, F., Lee, J. Y., Bui, T. H., & Bui, H. H. (2016). Adobe-MIT submission to the DSTC 4 Spoken Language Understanding pilot task. arXiv preprint arXiv:1605.02129.

Kim, S., D'Haro, L. F., Banchs, R. E., Williams, J. D., & Henderson, M. (2017). The fourth dialog state tracking challenge. In Dialogues with Social Robots (pp. 435-449). Springer Singapore.

* cited by examiner

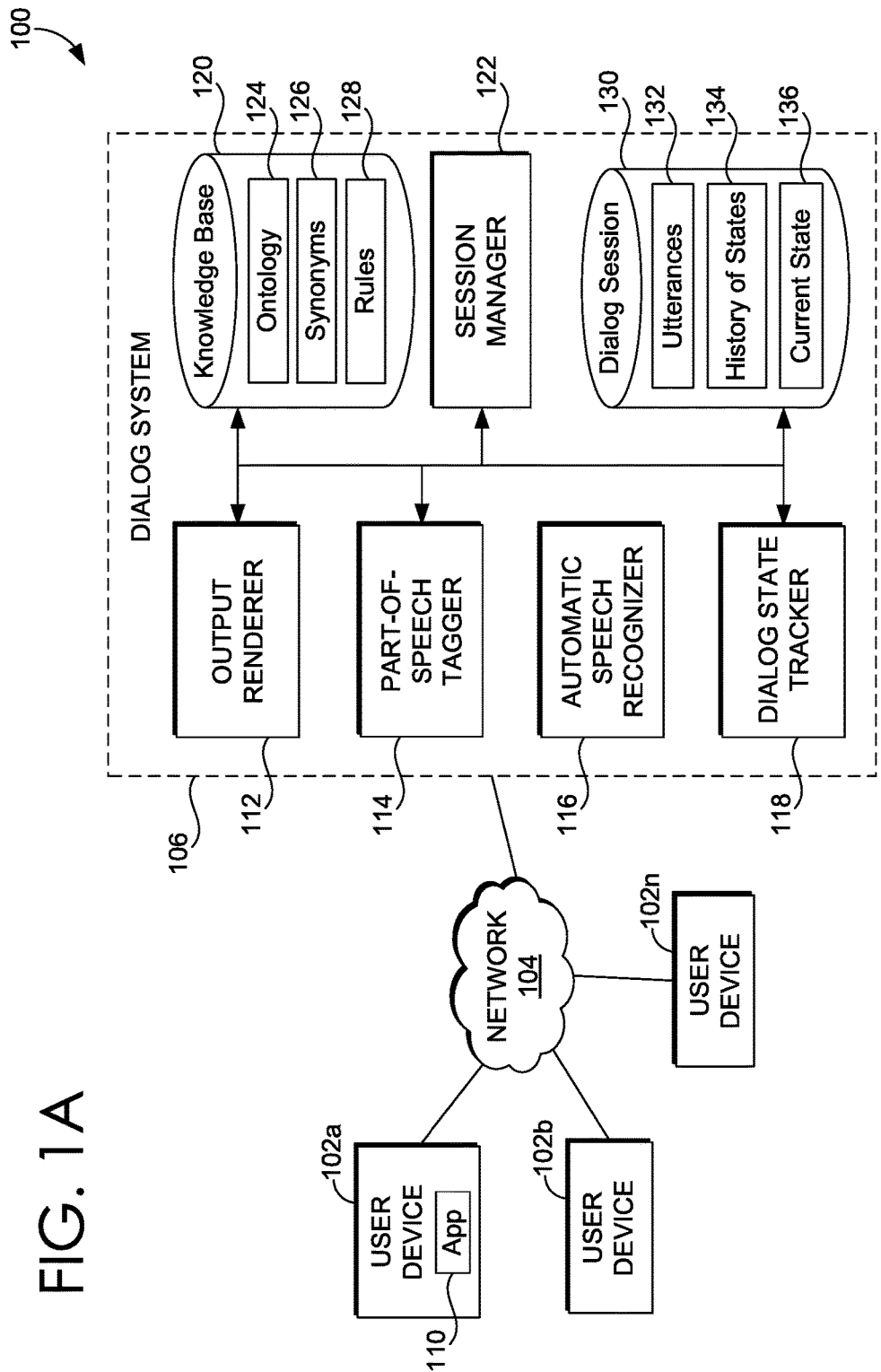

| Topic | (speaker G or T) Utterance | Predicted Dialog State |
|---|---|---|
| ATTRACTION | (T) %Hm I saw here that you have a relic temple. | {'PLACE': ['Chinatown Heritage Centre']} |
| ATTRACTION | (G) Okay. | {'PLACE': ['Chinatown Heritage Centre']} |
| ATTRACTION | (G) %Uh Buddha relic temple? | {'PLACE': ['Buddha Tooth Relic Temple and Museum']} |
| ATTRACTION | (T) Yes. | {'PLACE': ['Buddha Tooth Relic Temple and Museum']} |
| ATTRACTION | (G) Okay. | {'PLACE': ['Buddha Tooth Relic Temple and Museum']} |

260

| Topic | (speaker G or T) Utterance | Predicted Dialog State |
|---|---|---|
| ATTRACTION | (G) That is in Chinatown | {'NEIGHBOURHOOD': ['Chinatown']} |
| ATTRACTION | (T) %Uh that's in Chinatown? | {'NEIGHBOURHOOD': ['Chinatown']} |
| ATTRACTION | (G) Yes. | {'NEIGHBOURHOOD': ['Chinatown']} |
| ATTRACTION | (G) So there are a lot of things to do in Chinatown. | {'NEIGHBOURHOOD': ['Chinatown']} |
| ATTRACTION | (G) %Uh the Buddha Relic Temple is just located in Chinatown. | {'PLACE': ['Buddha Tooth Relic Temple and Museum'], 'NEIGHBOURHOOD': ['Chinatown']} |
| ATTRACTION | (G) And you could do those temple when you are going down to Chinatown. | {'PLACE': ['Buddha Tooth Relic Temple and Museum'], 'NEIGHBOURHOOD': ['Chinatown']} |
| ATTRACTION | (G) Alright. | {'PLACE': ['Buddha Tooth Relic Temple and Museum'], 'NEIGHBOURHOOD': ['Chinatown']} |

262

| Topic | (speaker G or T) Utterance | Predicted Dialog State |
|---|---|---|
| ATTRACTION | (G) So I'm going to show you again the image of the Buddha Relic Temple. | {'INFO': ['Image'], 'PLACE': ['Buddha Tooth Relic Temple and Museum']} |
| ATTRACTION | (T) Yes. | {'INFO': ['Image'], 'PLACE': ['Buddha Tooth Relic Temple and Museum']} |

| Topic | (speaker G or T) Utterance | Predicted Dialog State |
|---|---|---|
| | 270 | 272 | 274 | 266 |
| ATTRACTION | (T) Yes, so %uh Lynnette, I have a question. | {} |
| ATTRACTION | (T) So we can walk through the-through Chinatown and through this %um other attractions from another to-from other attraction to-for example Chinatown and its neighbouring attractions. | {'NEIGHBOURHOOD': ['Chinatown'], 'ACTIVITY': ['Walking']} |
| ATTRACTION | (G) %Uh yes. | {'NEIGHBOURHOOD': ['Chinatown'], 'ACTIVITY': ['Walking']} |
| ATTRACTION | (G) This is all %uh built %uh just in Chinatown itself. | {'NEIGHBOURHOOD': ['Chinatown'], 'ACTIVITY': ['Walking']} |
| ATTRACTION | (G) Chinatown has a few lanes. | {'NEIGHBOURHOOD': ['Chinatown'], 'ACTIVITY': ['Walking']} |
| ATTRACTION | (G) Alright, it's not just one street. | {'NEIGHBOURHOOD': ['Chinatown'], 'ACTIVITY': ['Walking']} |
| ATTRACTION | (G) So it's actually consists of quite a number of lanes. | {'NEIGHBOURHOOD': ['Chinatown'], 'ACTIVITY': ['Walking']} |
| ATTRACTION | (G) %Uh and one of the attractions %uh you are thinking of visiting is this Buddha Relic Temple. | {'PLACE': ['Buddha Tooth Relic Temple and Museum'], 'NEIGHBOURHOOD': ['Chinatown'], 'ACTIVITY': ['Walking']} |
| ATTRACTION | (T) Yah, that's nice. | {'PLACE': ['Buddha Tooth Relic Temple and Museum'], 'NEIGHBOURHOOD': ['Chinatown'], 'ACTIVITY': ['Walking']} |

FIG. 2C

| Topic | (speaker G or T) Utterance | Predicted Dialog State |
|---|---|---|
| ATTRACTION | (G) You can walk inside but there is a dress code. | {'INFO': ['Dresscode'], 'ACTIVITY': ['Walking']} |
| ATTRACTION | (T) %Uh dress code. | {'INFO': ['Dresscode'], 'ACTIVITY': ['Walking']} |
| ATTRACTION | (T) So what's the dress code? | {'INFO': ['Dresscode'], 'ACTIVITY': ['Walking']} |
| ATTRACTION | (G) %Uh dress code, you will have to be appropriately dressed. | {'INFO': ['Dresscode'], 'ACTIVITY': ['Walking']} |
| ATTRACTION | (G) For example %uh no like shorts. | {'INFO': ['Dresscode'], 'ACTIVITY': ['Walking']} |
| ATTRACTION | (G) Cute like I mean, sorry, %uh cargo pants %uh just will be fine. | {'INFO': ['Dresscode'], 'ACTIVITY': ['Walking']} |
| ATTRACTION | (G) %Uh singlet of course is not appropriate %uh dress code for %uh visiting any places of worship here. | {'INFO': ['Dresscode'], 'PLACE': ['Buddha Tooth Relic Temple and Museum'], 'ACTIVITY': ['Walking']} |
| ATTRACTION | (T) Yes. | {'INFO': ['Dresscode'], 'PLACE': ['Buddha Tooth Relic Temple and Museum'], 'ACTIVITY': ['Walking']} |

FIG. 2D

RULE-BASED DIALOG STATE TRACKING

BACKGROUND

Dialog state trackers are used by computers to predict what users have in mind based on conversational inputs, or utterances, that the users provide via speech, text, or other means. Dialog state trackers are useful for spoken dialog systems, such as Apple Siri™, Google Now™, Microsoft Cortana™, Amazon Echo™, Adobe DataTone™, and Adobe PixelTone™, as they provide a convenient and natural way for users to interact with computers. Computers can internally represent what a user has in mind as a set of slot-value pairs, referred to as a dialog state, and use the dialog state to determine which actions to take. A slot represents a general category (e.g., FOOD) and a value represents more specifically what the dialog participant has in mind (e.g., "Apples").

Computers that use dialog state tracking rely upon the accurate prediction of dialog states to determine appropriate responses to dialog. However, conventional approaches have difficulty accounting for the nuances of natural language. For example, conventional systems have difficulty identifying the presence of slot-value pairs in utterances when users do not provide the exact words or phrases that the systems use to recognize the slot-value pairs. Conventional systems also have difficulty choosing the correct slot-value pairs when the words or phrases used to recognize different slot-value pairs are similar, which is likely when there are many potential slot-value pairs to choose from.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Computers use natural language processing to facilitate computer-human interaction, enabling computers to derive meaning from human or natural language input. In order for these computers to function properly, it is critical that the natural language input accurately converted into a computer representation, such as a dialog state. Conventional systems that use dialog state tracking have difficulty choosing the correct slot-value pairs to include in dialog states. This often results in computer malfunction, where computers provide erroneous output or fail to provide any output to users.

Aspects of the present disclosure relate to rule-based dialog state tracking that allows computers to more accurately and reliably determine dialog states. A dialog state tracker employs various rules to predict dialog states of utterances. The dialog state tracker uses the rules to identify slot-value pairs of an ontology to include in dialog states. The rules enhance the ability of computers to identify the presence of slot-value pairs in utterances when users do not provide the exact words or phrases that systems typically use to recognize the slot-value pairs. The rules further enhance the ability of computers to choose the correct slot-value pairs when the words or phrases used to recognize different slot-value pairs are similar, which is likely when there are many potential slot-value pairs to choose from in the ontology.

Some of these rules are used for string-matching utterances to slot-values pairs of the ontology for inclusion in dialog states. Other rules allow slot-value pairs to be identified for dialog states based on coreferences between utterances and previous utterances. Further rules are used to determine which slot-value pairs, if any, to carry over to dialog states from dialog states of previous utterances. Yet other rules are used to remove slot-value pairs from candidate dialog states, which are later assigned as dialog states of utterances. These and other concepts are contemplated as being within the scope of the present disclosure.

BRIEF DESCRIPTION OF THE DRAWINGS

The present invention is described in detail below with reference to the attached drawing figures, wherein:

FIG. 1A shows a block diagram showing an example of an operating environment in accordance with embodiments of the present disclosure;

FIG. 2B shows examples of dialog session in accordance with embodiments of the present disclosure.

FIG. 2C shows an example of a dialog session in accordance with embodiments of the present disclosure.

FIG. 2D shows an example of a dialog session in accordance with embodiments of the present disclosure.

DETAILED DESCRIPTION

Figure 1B:
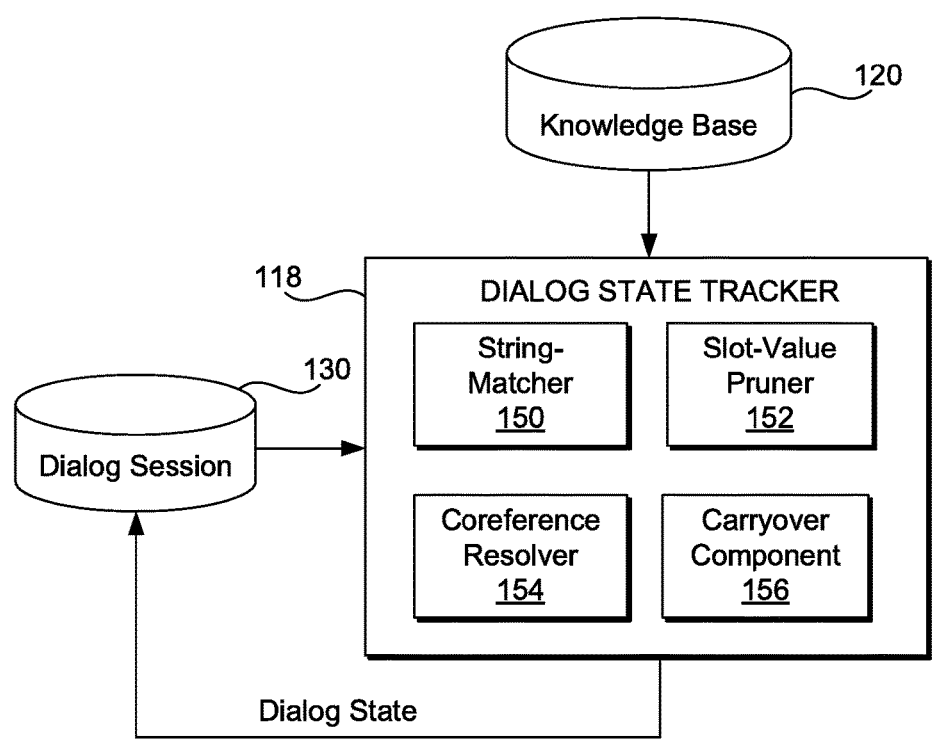
FIG. 1B shows a flow diagram illustrating an example of dialog state tracking in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A dialog state tracker is used to predict what a user has in mind based on a conversational input, or utterance, that the user provides via speech, text, or other means. Generally, a dialog state represents what the user has in mind as a set of slot-value pairs. The slot-value pairs represent various aspects of what the user has in mind, where a slot represents a general category (e.g., FOOD) and a value represents more specifically what the dialog participant has in mind (e.g., "Apples"). It is important that the dialog state tracker accurately select slot-value pairs for dialog states so that a computer can determine appropriate responses to utterances.

Computers use natural language processing to facilitate computer-human interaction, enabling computers to derive meaning from human or natural language input. In order for these computers to function properly, it is critical that the natural language input is accurately converted into a computer representation, such as a dialog state. Conventional systems that use dialog state tracking have difficulty choosing the correct slot-value pairs to include in dialog states. This often results in computer malfunction, where computers provide erroneous output or fail to provide any output to users.

The nuances of natural language that are reflected in utterances from users present a challenge to reliably predicting dialog states of the utterances. Often, users will not provide in dialog the exact words or phrases that a computer system uses to recognize slot-value pairs. As an example, a slot may symbolize a city name and its value may symbolize a specific city name that the ontology represents as the string "New York." Conventional approaches to dialog state tracking have difficulty identifying the value when an utterance does not explicitly contain "New York" (e.g., "The City that Never Sleeps" or "That city I mentioned earlier").

A further challenge arises when the strings (e.g., words or phrases) a computing system uses to recognize values of different slot-value pairs are similar. In these cases, the computing system may be unable to distinguish between which of the slot-value pairs should be included in the dialog state. One example is where two values correspond to sub-strings of another value. A conventional approach will improperly include three slot-value pairs when values include "Park Hotel," "Hotel" and "Park" and an utterance includes "Park Hotel," when only "Park Hotel" should be included in the dialog state. This is more likely to occur when the computing system uses a large ontology of slot-value pairs with many potential slot-value pairs to choose from.

Thus, as described above, conventional approaches often are unable to recognize slot-value pairs that should be included in dialog states. This results in computer malfunction, where a computer is unable to determine proper responses to users. Additionally, conventional approaches are prone to analyzing/taking into consideration many slot-value pairs for a dialog state when only some of them should be used. The computing power used to analyze the excessive slot-value pairs is wasted. Furthermore, the excessive slot-value pairs can cause a computer to determine an erroneous response to users.

The present disclosure provides various rules that dialog state trackers can use to accurately select which slot-value pairs to include in dialog states of utterances. These rules enhance the reliability of dialog state tracking in such complex cases as when slot-value pairs are not explicitly present in utterances, and when there are many potential slot-value pairs to select from in ontologies.

Some of these rules allow a dialog state tracker to identify synonyms of values when string-matching utterances to slot-values pairs of an ontology. As indicated above, typical approaches to string-matching only attempt to string-match to the string that represents a value of a slot-value pair in an ontology. By attempting to string-match to synonyms of values of slot-value pairs, slot-value pairs can be identified for dialog states even when their values are not explicitly present in utterances.

In this regard, a dialog state tracker may first attempt to string match to a value of a slot-value pair in an ontology (e.g., "New York"). If string-matching to the value fails, the dialog state tracker then attempts to string match to synonyms of the value (e.g., "The City that Never Sleeps," "The Big Apple," "Gotham," "The Empire City"). A list of synonyms of a value can be included in an ontology for use in string-matching, or at least one synonym can be generated from the value to use in string-matching. In another approach, the value itself is represented in the ontology as the list of synonyms. In string-matching using synonyms, the order the synonyms are selected to attempt string matching can be dictated by the ontology, such as by the order of the synonyms in the list.

Other rules described herein allow slot-value pairs to be identified for dialog states based on coreferences between utterances and previous utterances of a dialog session. A coreference is a linguistic phenomenon in which words or phrases refer to the same entity. In the utterances "I went to Paris last week." and "I had a great time there," the adverb "there" refers to the same entity as "Paris."

Coreference resolution aims to identify which slot-value pair a coreference corresponds to so that it can be included in a dialog state. Typical approaches to coreference resolution use the nearest preceding entity as a coreference, which fails to account for differences between slot-value pairs in an ontology (e.g., users may tend to use coreferences to hotels in different ways than with restaurants). The present disclosure provides a template-based approach to coreference resolution where templates define how to identify referring expressions in an utterance and what types of slot-value pairs are compatible with the referring expressions as entities. A slot-value pair that represents an entity of a coreference is referred to herein as a "coreferenced slot-value pair."

A template can define a referring expression in terms of any combination of one or more parts-of-speech, words, orderings, characters, and/or combinations or patterns thereof for identification to result. The template further defines a type of coreferenced slot-value pair that can be a coreference to the referring expression when present in a previous utterance of a dialog session. A type of coreferenced slot-value pair can be defined in terms of any combination of one or more parts-of-speech, words, orderings, characters, topics, slots, values, synonyms, and/or other characteristics of slot-value pairs and/or combinations or patterns thereof for identification to result. Using this template-based approach, coreferenced slot-value pairs are more accurately identified for utterances.

Rules are also provided for carrying over slot-value pairs from dialog states of previous utterances in a dialog session to a dialog state of a current utterance. In some cases, a slot-value pair is carried over when the slot-value pair is present in an utterance that occurs between a designated previous utterance and the current utterance. The number of previous utterances used to carry over a slot-value pair can depend on the slot-value pair, slot, or other typing, and may be machine-learned. Carrying over a slot-value pair may not be performed if it is determined that the current utterance includes a slot-value pair having the same slot, but a different value as the slot-value pair identified in a previous utterance. This approach can accurately determine which slot-value pairs to carry over, even where the current utterance does not identify the slot-value pairs therein (e.g., there is no coreference, value, or synonym in the utterance).

The slot-value pairs identified using any combination of the rules described above, and/or other rules, may be added to a candidate dialog state by a dialog state tracker. A "candidate dialog state" refers to a set of slot-value pairs prior to assigning the set as a predicted dialog state of an utterance. As a candidate dialog state, additional slot-value pairs can be added to the set or slot-value pairs can be removed from the set prior to assigning the set as a predicted dialog state. Predicted dialog states of utterances are included in a history of dialog states for a dialog session and can be used to predict dialog states of subsequent utterances in the dialog session.

The present disclosure also provides rules for removing slot-value pairs from candidate dialog states by merging them into a different slot-value pair of an ontology. A rule is used to map designated types of slot-value pairs to one or more other slot-value pairs in the ontology for merging. In some cases, slot-value pairs are merged based on corresponding to sub-strings of another slot-value pair of the ontology (e.g., based on determining that the words of the slot-value pairs are collectively equivalent to the words of the other slot-value pair in the ontology). This approach is used to accurately hone a potentially large number of slot-value pairs in a candidate dialog state, which can result when the ontology is large.

Dialog state tracking described herein is applicable to dialog systems using a wide variety of modalities, both input and output, such as speech, text, touch, gesture, and combinations thereof (e.g., multi-mode dialog systems). As used herein, "utterance" broadly encompasses any type of conversational input including, but not limited to, speech, text entry, touch, and gestures. An utterance can refer to an uninterrupted chain of words (e.g., spoken or written). A dialog session is a defined grouping of utterances. The utterances of a dialog session can be from one or more users and one or more user devices. An utterance includes an identifiable boundary, which can be used to break multiple utterances of a dialog session into discrete utterances. An example of boundaries of an utterance in spoken dialog is silence. Another example of boundaries of an utterance is a carriage return, end mark punctuation that signals an end to a sentence, and/or other designated characters.

References to or depictions of any modality-specific dialog system or conversational inputs should be read broadly to encompass other modalities or conversational inputs along with the corresponding hardware and/or software modifications to implement other modalities. References to and depictions of a spoken dialog system are merely illustrative of one suitable implementation of a dialog system modality benefiting from the dialog state tracking described herein and should not be construed as limiting the scope to speech modalities or a single modality.

Turning now to FIG. 1A, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and dialog system 106. It should be understood that operating environment 100 shown in FIG. 1A is an example of one suitable operating environment. Each of the components shown in FIG. 1A may be implemented via any type of computing device, such as one or more of computing device 700, described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data sources may be employed within operating environment 100 within the scope of the present disclosure. Each may comprise a single device or multiple devices cooperating in a distributed environment. For instance, dialog system 106 may be provided via multiple devices arranged in a distributed environment that collectively provide the functionality described herein. Additionally, other components not shown may also be included within the distributed environment. In some cases, dialog system 106 can be integrated, at least partially, into a user device, such as user device 102a. Furthermore, dialog system 106 may at least partially be a cloud computing service.

User devices 102a through 102n can be client devices on a client-side of operating environment 100, while dialog system 106 can be on a server-side of operating environment 100. Dialog system 106 can comprise server-side software designed to work in conjunction with client-side software on user devices 102a through 102n so as to implement any combination of the features and functionalities discussed in the present disclosure. An example of such client-side software is application 110 on user device 102a. Each other device includes a similar application, with similar functionality. This division of operating environment 100 is provided to illustrate one example of a suitable environment, and it is noted there is no requirement for each implementation that any combination of dialog system 106 and user devices 102a through 102n to remain as separate entities.

User devices 102a through 102n comprise any type of computing device capable of being operated by a user. For example, in some implementations, user devices 102a through 102n are the type of computing devices described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. As indicated above, the other user devices can include one or more applications similar to application 110. The application(s) may generally be any application capable of facilitating the exchange of information between the user device and the dialog system in carrying out a dialog session involving at least a user of the user device. In some implementations, the application(s) comprises a web application, which can run in a web browser, and could be hosted at least partially server-side. In addition, or instead, the application(s) can comprise a dedicated application, such as an application having personal assistant functionality. In some cases, the application is integrated into the operating system (e.g., as a service). It is therefore contemplated herein that "application" be interpreted broadly.

A user can provide input to dialog system 106 using application 110. The input may be provided by the user via a user interface of application 110, which can be client or server based (e.g., browser based). In some cases, user device 102a includes one or more input components for accepting user utterances, such as a microphone for accepting audio input (i.e., spoken utterances), a keyboard (physical or virtual via a touchscreen) for accepting text input (i.e., typed utterances), and a camera for accepting visual input (i.e., visual utterances that can be provided using sign language or hand writing.

The utterances from users are received by dialog system 106, which predicts dialog states of the utterances. A dialog state, as used herein, can refer to a representation of what one or more participants of, or users in, a dialog session have in mind based on what is expressed through utterances of the dialog session. A dialog state can be represented as a list of slot-value pairs. The slot refers to a general category, while the value represents more specifically what the dialog participants have in mind. The slot-value pairs are included in an ontology and may be organized into topics in the ontology. As used herein, an ontology can refer to a hierarchical knowledge representation used to define concepts and topics in a specific domain or area. An ontology can define relationships between concepts/topics and a constraint language. Ontology 124 is an example of such an ontology, which dialog system 106 selects from and analyzes to generate dialog states.

Figure 2A:
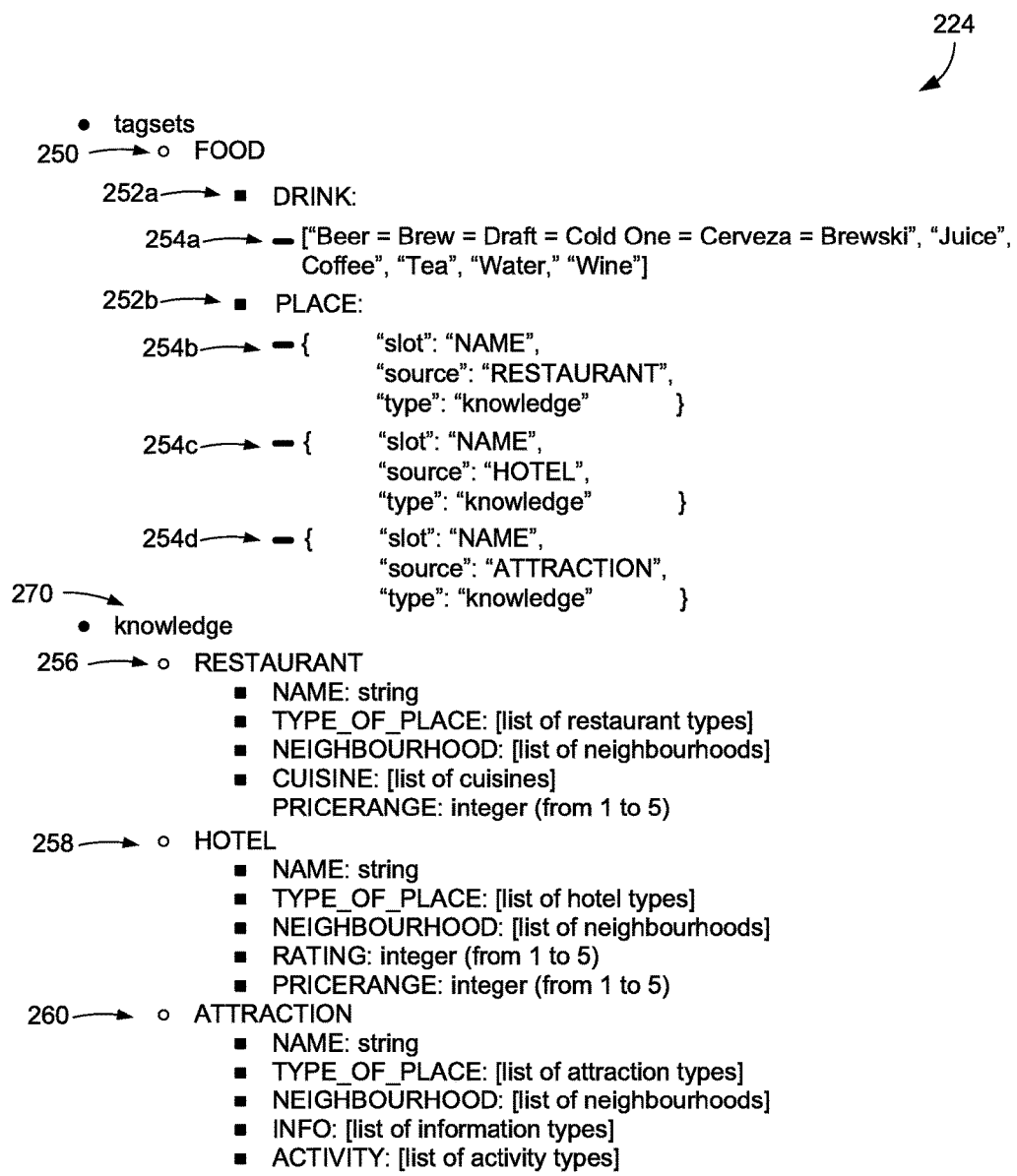
FIG. 2A shows an example of an ontology that can be employed in accordance with embodiments of the present disclosure.

Referring to FIG. 2A, an example of an ontology that can be employed in accordance with embodiments of the present disclosure is shown. Ontology 224 in FIG. 2A can correspond to ontology 124 in FIG. 1A. Ontology 224 includes many topics, such as topic 250 (FOOD). Slot-value pairs are organized into the topics. For example, topic 250 (FOOD) includes slot 252a (DRINK) and slot 252b (PALCE). Slot 252a is listed within its values 254a. The values in the list include "Beer," "Juice," "Coffee," "Tea," "Water," and "Wine." The value "Beer" includes a list of synonyms, each separated by an "=" symbol. Slot 252b is an example of a slot that includes pointers to values in knowledge base 270. Pointer 254b points to knowledge category 256 (RESTAURANT), pointer 254c points to knowledge category 258 (HOTEL), and pointer 254d points to knowledge category 260 (ATTRACTION). When a slot includes a pointer to a knowledge category, the pointer can take on any value that is defined with that knowledge category in knowledge base 270. A dialog state can comprise a combination of the slot-value pairs from ontology 224.

FIG. 1A shows a functional block diagram of dialog system 106. As shown, dialog system 106 includes output renderer 112, part-of-speech tagger 114, automatic speech recognizer 116, dialog state tracker 118, knowledge base 120, and dialog session manager 122.

Dialog system 106 corresponds to implementations in which a spoken dialog system is employed. However, as noted above, the present disclosure is applicable to a wide variety of modalities. Dialog system 106 allows a user of user device 102a to provide spoken language inputs, which form the utterances of a dialog session, by way of example. It will be appreciated that the components of dialog system 106 are merely examples of suitable components and may vary based on the modalities employed, as well as other factors. As an illustration of the foregoing, in some cases, dialog system 106 may not include, for example, one or more of part-of-speech tagger 114 and automatic speech recognizer 116.

Session manager 122 is configured to manage dialog sessions, such as those comprising utterances from users. In the implementation shown, session manager 122 is a stateful component that monitors and controls dialog state tracking for dialog sessions. Session manager 122 is configured to control dialog state tracking of dialog sessions by updating and maintaining the dialog session. In FIG. 1A, dialog session 130 is one example of such a dialog session. Dialog session 130 includes utterances 132, history of states 134 (i.e., a history of dialog states), and current state 136 (i.e., a current dialog state).

In the implementation shown, utterances 132 are generated from the inputs to dialog system 106 from one or more user devices. The inputs are provided by session manager 122 to automatic speech recognizer 116, which is an example of an utterance decoder that may be employed in a dialog system. The utterance decoder receives utterances from applications on the user devices (e.g., application 110) and converts the utterances into computer readable text. The computer readable text comprises a text representation of one or more utterances from the user.

In some cases, the utterance decoder is responsible for breaking a dialog session up into utterances. For example, a dialog session could be received as a block of text that indicates the boundaries of utterances, such as after the dialog session has completed. In other cases, the utterance decoder receives the dialog session in real time. As an example, each utterance could be received by dialog system 106 as a respective audio file or text string. In this case, the file or string might correspond to the boundaries of the utterance.

In the present example, automatic speech recognizer 116 converts spoken utterances from users into computer readable text for processing by dialog system 106. Where other modalities are employed, the utterance decoder can be configured as needed to provide decoding into computer readable text for those modalities. Further, in some cases, no decoding may be necessary, such as where dialog system 106 is provided with computer readable text. As an example, utterance decoding may occur at least partially on the user device that provides the utterance, or no decoding may be necessary.

Thus, each utterance can be represented as computer readable text, such as from the utterance decoder (e.g., automatic speech recognizer 116). Optionally, each utterance can include one or more part-of-speech tags. In some cases, dialog state tracker 118 operates on the computer readable text (e.g., utterances 132) comprising part-of-speech tags.

Dialog system 106 can generate part-of-speech tags using part-of-speech tagger 114. The part-of-speech tags can augment the computer readable text corresponding to the utterances. Optionally, additional processing could be performed on the computer readable text after part-of-speech tagging by part-of-speech tagger 114. It is noted that in some cases, dialog system 106 does not include part-of-speech tagger 114. For example, computer readable text could be provided as an input to dialog system 106 with existing part-of-speech tags. As a further example, in some cases, dialog state tracker 118 may be implemented without employing part-of-speech tags. It is additionally noted that at least some part-of-speech tagging could be performed after providing the computer readable text of any of utterances 132 to dialog state tracker 118. As one example, part-of-speech tagging could be performed as needed by dialog state tracker 118 using part-of-speech tagger 114.

The computer readable text from the utterance decoder, or otherwise provided to dialog system 106, can be provided to part-of-speech tagger 114 by session manager 122, optionally after additional processing by dialog system 106. Any suitable part-of-speech tagger can be employed to assign one or more part-of-speech tags or labels to one or more words and or other tokens in the utterances, examples of which have been described above. It is noted that in some cases, part-of-speech tagging can occur, at least partially on the user device that provides the utterance, or on another device. As an example, dialog system 106 could receive computer readable text with corresponding part-of-speech tags.

The part-of-speech tags identify a grammatical part-of-speech of a word in the utterance. The Penn Treebank Tagset includes a set of suitable tags that can be used in implementations of the present disclosure. Applying the tags to the utterance "The cat is happy" may result in "The/DT cat/NN is/VB happy/JJ." Here, the tag DT indicates that "The" is a determiner, NN indicates that "cat" is a Noun, VB indicates that "is" is a verb, and JJ indicates that "happy" is an adjective. Examples of potential part-of-speech tags include noun, article, verb, adjective pronoun, possessive adjective, demonstrative pronoun, common noun, and the like.

In managing dialog session 130, session manager 122 provides inputs of dialog session 130 to dialog state tracker 118 and receives outputs comprising dialog states of dialog session 130 from dialog state tracker 118. The inputs include the utterances that are represented by computer readable text (e.g., utterances 132), which dialog state tracker 118 analyzes to determine dialog states (e.g., later stored as history of states 134 and current state 136) of the utterances.

In some implementations, session manager 122 and dialog state tracker 118 operate on live dialog sessions to determine one or more dialog states. However, in some cases, at least some dialog sessions may have already completed, potentially prior to any analysis by dialog state tracker 118 (i.e., a post hoc analysis). Furthermore, dialog state tracking for live dialog sessions may be in real time or delayed by one or more utterances.

Dialog state tracker 118 can be a computer program that predicts what the dialog state is of a given utterance, given all the dialog history up to that utterance. The given utterance can be the current utterance in utterances 132 (e.g., the most recent utterance), which has a dialog state stored as current state 136. The dialog history can include the previous utterances in utterances 132, which occur prior to the current utterance in dialog session 130 and corresponding dialog states of those previous utterances (e.g., history of states 134). Dialog state tracker 118 employs various rules (e.g., rules 128) to predict dialog states of utterances. The rules are used to determine which slot-value pairs to include in a dialog state and are later described in detail.

In response to predicting dialog states of utterances, dialog system 106 can take one or more machine actions. This can include session manager 122 providing output to one or more of the user devices, such as the user device that provided an utterance, using output renderer 112. For example, output renderer 112 can map the dialog states to actions that can result in computer output. The mapping dictates the machine actions based which slot-value pairs are in dialog states. This includes optionally participating in the dialog session and responding to a user or users (e.g., based on current state 136). However, it is noted that dialog system 106 need not be an active participant in the dialog session.

Application 110 may include one or more output components for rendering the output from output renderer 112 of dialog system 106, such as a display screen for producing visual output and/or an audio transducer (e.g., a speaker) for generating audible output (e.g., computer generated speech). A user can respond to the output by providing an additional utterance to the dialog session.

Referring to FIGS. 2B, 2C, and 2D, examples of dialog sessions are shown. In particular, FIGS. 2B, 2C, and 2D, show dialog sessions 260, 262, 264, 266, and 268, which can each be examples of dialog session 130 in FIG. 1A. As shown, the dialog sessions each include utterances (e.g., utterances 132), which are displayed in column 272 as computer readable text. Each row in a table corresponds to a respective utterance. In the example shown, the dialog sessions are between multiple users, but any number of users could participate in a dialog session.

Also shown, the dialog sessions each include a history of dialog states (e.g., history of states 134), which can correspond to column 274 in the tables. A colon follows a slot and the value(s) of the slot follow the colon. The final row of each table can correspond to current state 136. In some cases, the history of dialog states further include a topic that corresponds to the predicted dialog state, which can correspond to column 270. The topic and dialog states shown can be generated from ontology 224, by way of example.

FIG. 1B shows a flow diagram illustrating an example of dialog state tracking in accordance with embodiments of the present disclosure. Session manager 122 of FIG. 1A can provide information to dialog state tracker 118 from dialog session 130 and knowledge base 120. The information from dialog session 130 includes utterances 132, which includes a given utterance for which a dialog state is to be predicted by dialog state tracker 118. The information also includes history of states 134, ontology 124, synonyms 126, and rules 128 from knowledge base 120. Based on this information, dialog state tracker 118 predicts a dialog state, and outputs the dialog state of the given utterance, as shown. Session manager 122 stores the predicted dialog state as current state 136 and adds the dialog state to history of states 134. The process can repeat for using a new or subsequent utterance as the given utterance until dialog session 130 completes. This could optionally be triggered by dialog system 106 receiving the new utterance, which session manager 122 adds to utterances 132 of dialog session 130.

Thus, as dialog state tracker 118 identifies additional dialog states of utterances, history of states 134 can increase so as to capture a history of dialog states in the dialog session up to the current dialog state being analyzed by dialog state tracker 118. As will later be described in further detail, in some implementations, dialog state tracker 118 uses the history of dialog states to predict the dialog state of the new or current utterance, and optionally may revise one or more dialog states in the history.

Dialog state tracker 118 comprises string-matcher 150, slot-value pruner 152, coreference resolver 154, and carry-over component 156 for generating a candidate dialog state from a current utterance. As described above a "candidate dialog state" refers to a set of slot-value pairs prior to using the set as a predicted dialog state of an utterance. As a candidate dialog state, additional slot-value pairs can be added to the set or slot-value pairs can be removed from the set prior to using the set as a predicted dialog state. Predicted dialog states of utterances are included in a history of dialog states for a dialog session and can be used to predict dialog states of new utterances in the dialog session. A "set" when referring to slot-value pairs is herein used in a mathematical sense in which the set can include zero to any number of slot-value pairs. In some embodiments, dialog state tracker 118 includes more or fewer components. In generating the candidate dialog state, these various components implement rules 128 from knowledge base 120.

String-matcher 150 is configured to add at least one slot-value pair to a candidate dialog state based on string-matching the current utterance to slot-value pairs. The slot-value pairs are selected by string-matcher 150 from ontology 224, as one example. In doing so, string-matcher 150 can identify a sub-string of the current utterance, and attempt to match that sub-string to at least one value in ontology 224. In particular, string-matcher 150 can attempt to match the sub-string to a string that represents the value (also referred to herein as a "value string"). When string-matcher 150 determines that the sub-string matches the value, the slot-value pair(s) corresponding to that value can be added to the candidate dialog state.

As an example, assume an utterance is represented as the computer readable text "I love New York." String-matcher 150 can attempt to match the string "New York," which represents a value of a slot-value pair to the sub-string "love" from the utterance. String-matcher 150 can determine that a match does not exist and therefore the slot-value pair is not added to a candidate dialog state based on this attempt at string-matching. Subsequently, string-matcher 150 may attempt to match the sub-string "New York" from the utterance to the string "New York." String-matcher 150 can determine that a match does exist and therefore add the slot-value pair to the candidate dialog state based on this attempt at string-matching.

In various implementations, string-matcher 150 performs string-matching in a word-based fashion by iterating over all the spaces in the utterance. For each space, string-matcher 150 iterates over all potential values in ontology 224 and attempts to string match a sub-string corresponding to the word and/or combination of words defined by the space to the values.

String-matching between the utterance and the values can allow for misspellings. In some cases, a match can still occur where the sub-string includes one spelling mistake, or some other designated number of spelling mistakes (e.g., "New Yrk"). A spelling mistake can be defined, as one example, as a character difference between the sub-string and the value string. As another example, a spelling mistake can be defined as the Levenshtein distance between the sub-string and the value string. The costs of an insertion, deletion, or modification can be set to 1 in calculating the Levenshtein distance. In some cases, the string-matching is case-insensitive, such that differing capitalization does not constitute a misspelling.

In some embodiments, the number of spelling mistakes that are allowed by string-matcher 150 depends on the length of the value string. One or more threshold character lengths could be used to determine how many spelling mistakes to allow. As an example, where the string value's character length exceeds a threshold number T, a match may be made where the Levenshtein distance between the strings is 1 or fewer, otherwise, no match may be made.

In some implementations, string-matcher 150 determines the threshold number T that is used based on the number of words contained in the string value. If the value string includes one word, T can be set to 5 by string-matcher 150, and if the string value includes more than one word, T can be set to 3 by string-matcher 150, as one specific example.

In some cases, the value string used in string-matching a slot-value pair is extracted from the ontology. For example, one of values 254c in ontology 224 could comprise the value string "Chinatown," which is used in attempting to string-match the value to sub-strings from the utterance. If multiple slot-value pairs comprise the value string "Chinatown," a single sub-string could be matched to multiple slot-value pairs.

Typically, a single string is included in an ontology for a value (i.e., a single string that represents the value in the ontology) and if that does not match the sub-string, no match is made. Thus, only values explicitly present in the utterance can be matched. In accordance with some implementations, string-matcher 150 employs synonyms of values in string-matching the values. String-matcher 150 can determine that a sub-string of an utterance matches a value of a slot-value pair when the sub-string matches a string that represents at least one synonym of the value. Synonyms 126 in FIG. 1A are examples of such synonyms.

In some implementations, synonyms 126 comprise lists of synonyms for values of ontology 124. Each list of synonyms can be assigned to a respective value to be used for string-matching for the value. Each synonym of synonyms 126 can be represented as a string, which is used to attempt to string-match to that synonym. A synonym can include one or more words. An example of a synonym list for a "New York City" is {"The Big Apple," "The City That Never Sleeps," "Gotham," "The Empire City"}. As used herein synonyms have distinct stems and lemmas. Thus, for example, "walk" "walked," and "walking" should not be considered synonyms since "Walk" is the base form for each. However, it is noted that in various implementations, string-matcher 150 can use lemmatization and/or stemming algorithms is matching values to sub-strings of utterances. Thus, for example, string-matching for a value represented by the string "walk" in the ontology could use each of "walk," "walked," and "walking" as value strings for the same value (or synonym thereof).

It is noted that the list of values can be stored in ontology 124. Furthermore, rather than having a single string representing a value in the ontology, in some implementations, the value itself is represented as the list of synonyms. In other cases, string-matcher 150 attempts to match synonyms conditioned upon attempting and failing to match a sub-string to the value string specified in the ontology.

Where a list of synonyms to a value are employed, and used for string-matching, the order string-matcher 150 attempts to match to the synonyms can be dictated by the ontology, such as by the order of synonyms in the list, or another specified order. In some cases, string-matcher 150 determined that the utterance matches the value upon identifying a single match between a sub-string from the utterance and a string representing the value.

While a list of synonyms has been described above, in some cases, at least one of the synonyms of the value may be generated from the value in the ontology. As an example, string-matcher 150 could use a string representing the value in the ontology and lookup the string in a thesaurus or index. The lookup can return one or more synonyms used for string-matching the value. These and other variations of employing synonyms of values in string-matching are contemplated herein.

Lists of synonyms (e.g., synonyms 126) used by string-matcher 150 can optionally include a specification of synonym word ordering. If employed, string-matcher 150 utilizes the specified word ordering for a synonym in string-matching to an utterance. For example, the specification of word ordering for a synonym can indicate whether one or more words of the synonym must appear in a specified order in the utterance for a match to result. As an example, a synonym could be "Amoy Hotel," but the words "Amoy" and "Hotel" could appear anywhere in the utterance. Syntax can be employed in the lists of synonyms where using the symbol ";" or other syntax indicates to string-matcher 150 that the word order does not matter in string-matching. As a result, including "Amoy; Hotel" in a synonym list for "Amoy by Far East Hospitality 4" can cause string-matcher 150 to determine the slot-value pair is present for any utterance that includes "Amoy" and "Hotel." Without the syntax, string-matcher 150 enforces the ordering of the words/characters in the synonym list. In some implementations, no specific syntax is required for string-matcher 150 to allow this variable ordering or positioning of the words of the synonym in an utterance.

Lists of synonyms (e.g., synonyms 126) used by string-matcher 150 can optionally include a specification of a part-of-speech requirement. When string-matcher 150 identifies a part-of-speech requirement for a synonym, string-matcher 150 can enforce not only string-matching between the synonym and the utterance, but also part-of-speech matching between the synonym and the utterance, in order for the slot-value pair to be added to the candidate dialog state. For example, when synonyms 126 define a synonym for a slot-value pair as "show (N)," string-matcher 150 can identify the syntax and as a result require that any sub-string of the utterance be of the same part-of-speech (e.g., a noun in this case) as the synonym in order to be considered present in the utterance. The part-of-speech tags of the utterance described above, for example, provided by part-of-speech tagger 114 can be used for the part-of-speech matching. Each word in a synonym can optionally have a part-of-speech requirement specified. Thus, one word of a synonym may require part-of-speech matching while another may have no such requirement in determining whether the synonym is present.

When synonyms are employed for string-matching, string-matcher 150 can also perform the string-matching in a word-based fashion by iterating over all the spaces in the utterance. For each space, string-matcher 150 iterates over all potential values in ontology 224 and attempts to string match a sub-string corresponding to the word and/or combination of words defined by the space to the values. In doing so, for each synonym of the value, string-matcher 150 can compare the synonym with a sub-string of size L in the utterance, which starts immediately after the considered space, where L is the size of the synonym in characters. If a string that represents the synonym matches the sub-string, then the corresponding slot-value pair is added to the candidate dialog state.

Where the synonym is order-insensitive, string-matcher 150 can iterate this same matching processes on each word that the synonym includes. If all words are detected as present, the slot-value pair is detected as present and is added to the candidate dialog state. Also, if the synonym is conditioned upon having a part-of-speech requirement met, then string-matcher 150 only detects the slot-value pair as being present if the part-of-speech corresponding to the word in the utterance is the same as the one indicated in the synonym list.

In some cases, the ontology utilized by dialog state tracker 118 includes overlapping values, and/or synonyms, which can result in excessing slot-value pairs being included in the candidate dialog state. In some implementations, where string-matcher 150 identifies that one string matched to the utterance for a slot-value pair is a sub-string of another string matched to the utterance for another slot-value pair, the slot-value pair is excluded from the candidate dialog state, such as by deleting the slot-value pair from the candidate dialog state. Thus, for example, as an example, where values that are matched correspond to "Park Hotel" and "Grand Park Hotel," the former value represented by "Park Hotel" is excluded from the candidate dialog state.

Coreference resolver 154 is configured to add at least one slot-value pair to a candidate dialog state based on detecting a coreference between the utterance and one or more previous utterances in the dialog session. In particular, slot-value pair can be a coreferenced slot-value pair between the utterance and one or more previous utterances in the dialog session. In various implementations, this is accomplished using one or more templates. Each template defines how to identify one or more sub-strings from the utterance, which when present indicates a potential coreferenced slot-value pair with a previous utterance. Coreference resolver 154 can utilize the template to identify there sub-strings in the utterance. When an identification is made, coreference resolver 154 analyzes the one or more previous utterances and attempts to identify one or more coreferenced slot-value pairs. If the identification is successful, any coreferenced slot-value pairs can be added to the candidate dialog state. The template can further include criteria for identifying coreferenced slot-value pairs when using that template.

Criteria defined by a template and used to identify sub-strings of an utterance can require one or more parts-of-speech, words, characters, and/or combinations or patterns thereof for identification to result. An example of a suitable template defines that the one or more sub-strings are identified when they correspond to a possessive adjective followed by an attribute of a participant of the dialog session (e.g., a noun phrase). Coreference resolver 154 can accomplish this identification utilizing part-of-speech tags of words of the utterance. Using this template, an identification would occur when the utterance contains "your hotel," as one example. As another example, a suitable template defines that the one or more sub-strings are identified when they correspond to a demonstrative pronoun followed by a common noun (e.g., a noun phrase). Using this template, an identification would occur when the utterance contains "that hotel," as one example.

Criteria defined by a template and used to identify a coreference slot-value pair in one or more previous utterances can specify a type of coreferenced slot-value pair. Types of coreferenced slot-value pairs can be defined in terms of, for example, one or more parts-of-speech, words, orderings, characters, topics, slots, values, synonyms, and/or other characteristics of slot-value pairs and/or combinations or patterns thereof for identification to result. For example, the type of coreferenced slot-value pair could be defined as any slot-value pair that matched a slot in a list of slots in the template. As another example, for the templates described above, the type of coreferenced slot-value pair is defined as any slot-value pair of the same type as the noun phrase of the sub-string identified in the utterance. Types of slot-value pairs could be specified in the ontology and utilized for this purpose. In the example above, the type could be "hotel" and one or more slot-value pairs could be assigned the "hotel" type in the ontology. Thus, for example, if a slot-value pair corresponding to "The Grand Hotel" is identified by coreference resolver 154 in a previous utterance, coreference resolver 154 can add that coreferenced slot-value pair to the candidate dialog state if it is labeled as "hotel" type in the ontology.

A further example of a suitable template defines that the one or more sub-strings are identified when they correspond to a predicate. The template may require the predicate to be one or more particular types of predicate, such as a locative predicate (e.g., "there" or "here"). This could be accomplished, for example, by specifying a list of predicate (e.g., strings) that can be matched to the template when present in an utterance. Criteria defined by the template and used to identify a coreference slot-value pair in one or more previous utterances can specify a type of coreferenced slot-value pair. It is noted that different templates can use different types or combinations thereof and the ontology could assign multiple types to at least some of the slot-value pairs therein. Where the predicate is a locative predicate, the type can comprise each location-related slot in the ontology.

It is noted that in various implementations, coreference resolver 154 includes the last slot-value pair in the previous utterances that matches the template in the candidate dialog state. In some cases, a limit may be imposed on how far back in the dialog session coreference resolver 154 can go to search for a match therein (e.g., how many previous utterances). In some implementations, the slot-value pairs that are analyzed and identified are those included in the history of dialog states in the dialog session. In the example, shown, coreference resolver 154 analyzes history of states 134 for this purpose. However, slot-value pairs need not be identified from previous dialog states in all implementations.

Slot-value pruner 152 is configured to remove at least one slot-value pair from the candidate dialog state. Removing slot-value pairs can include any combination of deleting a slot-value pair or merging slot-value pairs. In some implementations, two or more slot-value pairs in the candidate dialog state are merged into a different slot-value pair of the ontology. The two slot-value pairs can be merged, for example, using a rule that maps designated types of slot-value pairs to one or more other slot-value pairs in the ontology. The types can be similar to or different than the types described above for coreference resolution. In some cases, the merging is based on slot-value pruner 152 identifying values of slot-value pairs in the candidate dialog state that correspond to respective sub-strings of a slot-value pair in the ontology. Based on this identification, slot-value pruner 152 can merge the slot-value pairs by deleting them from the candidate dialog state and adding the slot-value pair from the ontology.

As an example of merging slot-value pairs, assume that the candidate dialog state includes one slot-value pair having a slot of "PLACE" and a value of "Hotel 81" and another slot-value pair having a slot of "NEIGHBORHOOD" and a value of "Chinatown." Slot-value pruner 152 can determine that these values each correspond to a respective sub-string of a slot-value pair having a slot of "PLACE" and a value of "Hotel 81—Chinatown" in the ontology. Based on this determination, slot-value pruner 152 can replace those slot-values with the slot-value page from the ontology. In some cases, for merging to occur, at least one of the slot-value pairs must correspond to each word in the value of the slot-value pair in the ontology.

In some implementations, the removing of slot-value pairs is template based. A template can define one or more types of slot-value pairs that can be merged by the template when identified in the candidate dialog state. The template can further define one or more types of slot-value pairs that those slot-value pairs can be merged into in the ontology. As an example, the types can be one or more designated slots. In the example above, the template could be require a slot-value pair having a "PLACE" slot and a slot-value pair having a "NEIGHBORHOOD" slot. Further, the template could specify that their values can only be mapped to a slot-value pair in the ontology having a "PLACE" slot (and/or another designated slot).

Slot-value pruner 152 can remove slot-value pairs from the candidate dialog state using other approaches, in addition to, or instead of the approach discussed above where slot-value pairs are merged from slot-value pairs from the ontology (e.g., that are not present in the candidate dialog state). As an example, for slot-value pair, the ontology can contain additional information about the value. One such slot-value pair corresponds to slot 252a and value 254a in ontology 224, which can represent a name of a hotel. Ontology 224 includes additional information such as the neighborhood and price range of the hotel. When multiple hotel branches (having respective slot-value pairs in the same slot) are in the candidate dialog state, slot-value pruner 152 can analyze whether any of the other related information about the hotel is in the context (e.g., the candidate dialog state and/or dialog states of one or more previous utterances) and determine a most likely hotel based on the observation (e.g., based on the number of related slot-value pairs). In some implementations, based on failing to identify context, slot-value pruner 152 selects the hotel that is the most likely based on prior observations from training data. Although the slot-value pair described above corresponds to a hotel, it will be appreciated that the foregoing example is applicable to any desired slot-value pair.

As a further example of removing slot-value pairs, for slot-value pairs of special (e.g., designated) slots such as "TO" and "FROM," slot-value pruner 152 can use syntactic parsing trees in order to determine whether each corresponding value in the utterance follows a preposition such as "to," "into," "towards," and "from." Slot-value pruner 152 determines the most likely slot-value pair(s) based on this and the order in which the values appear in the utterances and any unlikely slot-value pairs are removed (e.g., using a threshold confidence value).

Carryover component 156 is configured to carry over at least one slot-value pair from the history of dialog states, such as history of states 134. Carryover component 156 is used determine which slot-value pairs to carry over to a candidate dialog state from dialog states of previous utterances. Carryover component 156 allows dialog state tracker to include slot-value pairs in the candidate dialog state from dialog states of previous utterances, even where the current utterance does not identify the slot-value pairs (e.g., there is no coreference, value, or synonym in the utterance).

As an example, carryover component 156 may carry over a slot-value pair from a previous dialog state based on determining that the slot-value pair is present in at least one utterance that occurs between a designated previous utterance and the current utterance. The designated previous utterance could be for example, the fourth previous utterance, such that carryover component 156 analyzes the dialog states of the first, second, and third dialog states for carry over.

In some implementations, the number of previous consecutive dialog states that carryover component 156 searches is based on the slot-value pair. For example, for one slot-value pair, two previous consecutive dialog states could be analyzed, for another, only one previous consecutive dialog state could be analyzed, and for yet another, no previous consecutive dialog state could be analyzed, depending on the slot-value pair. In some implementations, the number of previous consecutive dialog states is based on the slot of the slot-value pair. For example, the same number could be used for each slot-value pair that shares the same slot. In addition, or instead, the number can be based on the topic of the slot-value pair (e.g., the number may depend, at least partially, on the topic of the slot-value pair). Also in some implementations, the number for a particular topic, slot, slot-value, or combination of characteristics is machined learned, such as by analyzing training data and comparing the output of carryover component 156 to reference output.

Also in some implementations, carryover component 156 refrains from carrying over a slot-value pair based on identifying that the candidate dialog state includes a slot-value pair having the same slot and a different value than the slot-value pair. Thus, in some cases, carryover component 124 refrains from carrying over a slot-value pair regardless of whether the slot-valued pair is present is a previous dialog state. For example, whenever a carryover component 156 detects a slot-value pair as present in one of the searched previous dialog states, carryover component 156 can carry over the slot-value pair to the candidate dialog state unless another value appears for the same slot in the candidate dialog state. In addition, or instead, in some cases, carryover component 124 refrains from carrying over a slot-value pair based on detecting the slot-value pair in the candidate dialog state having a different topic than in the previous utterance(s) (e.g., by comparing the topics).

As an example, the designated previous utterance could be defined as the third to the last utterance from the current utterance. In some cases, the number of previous utterances that are analyzed depends on the slot-value pair, slot, or other typing defined by the ontology, and may be machine-learned. In further respects, when a slot-value pair is analyzed, carrying over the slot-value pair may be based on determining that the candidate dialog state of the utterance does not include a slot-value pair having the same slot as the slot-value pair from the previous utterance with a new value.

In some implementations, upon completing analysis of an utterance, dialog state tracker 118 can assign the candidate dialog state as the predicted dialog state of the utterance, which is used to update current state 136 of dialog session 130. However, in other implementations, outputs (i.e., candidate dialog states) from one to all of string-matcher 150, coreference resolver 154, slot-value pruner 152, and carryover component 156 are used to generate features of a plurality of features in a fuzzy matching algorithm, which attempts to match slot-value pairs of the ontology to the utterance using the algorithm. For example, the features can be applied to generate fuzzy matching scores for the slot-value pairs, which are considered present in a dialog state of the utterance when the score exceeds a threshold value. The fuzzy matching algorithm can employ machine-learning for weights assigned to the features. Each output from a respective component can correspond to one or more features in the fuzzy matching algorithm (e.g., a respective feature for each output or outputs can be combined in generating one or more features).

As indicated above, one or all of string-matcher 150, coreference resolver 154, slot-value pruner 152, and carryover component 156 can be employed in various implementations of a dialog state tracker. It is further noted that the order that these components are employed can vary. One suitable approach employs string-matcher 150 to generate an initial candidate dialog state, followed by coreference resolver 154 adding slot-value pairs to the candidate dialog state, then slot-value pruner 152 removing slot-value pairs from the candidate dialog state, and finally, carryover component 156 carrying over slot-value pairs into the candidate dialog state. The candidate dialog state is assigned as the predicted dialog state upon completion of analysis by carryover component 156. As another example, the ordering of coreference resolver 154 and slot-value pruner 152 could be reversed. Any suitable ordering of the components can be employed, and furthermore one or more intervening components could be integrated into the flow. It is further noted that at least some of the functionality described herein with respect to the components could be performed concurrently, or ordering of functionality of a single component could be variable with respect to functionality of other components. In other words, in some implementations, a component need not complete its entire role in predicting a dialog state prior to another component contributing to the predicting.

Figure 3:
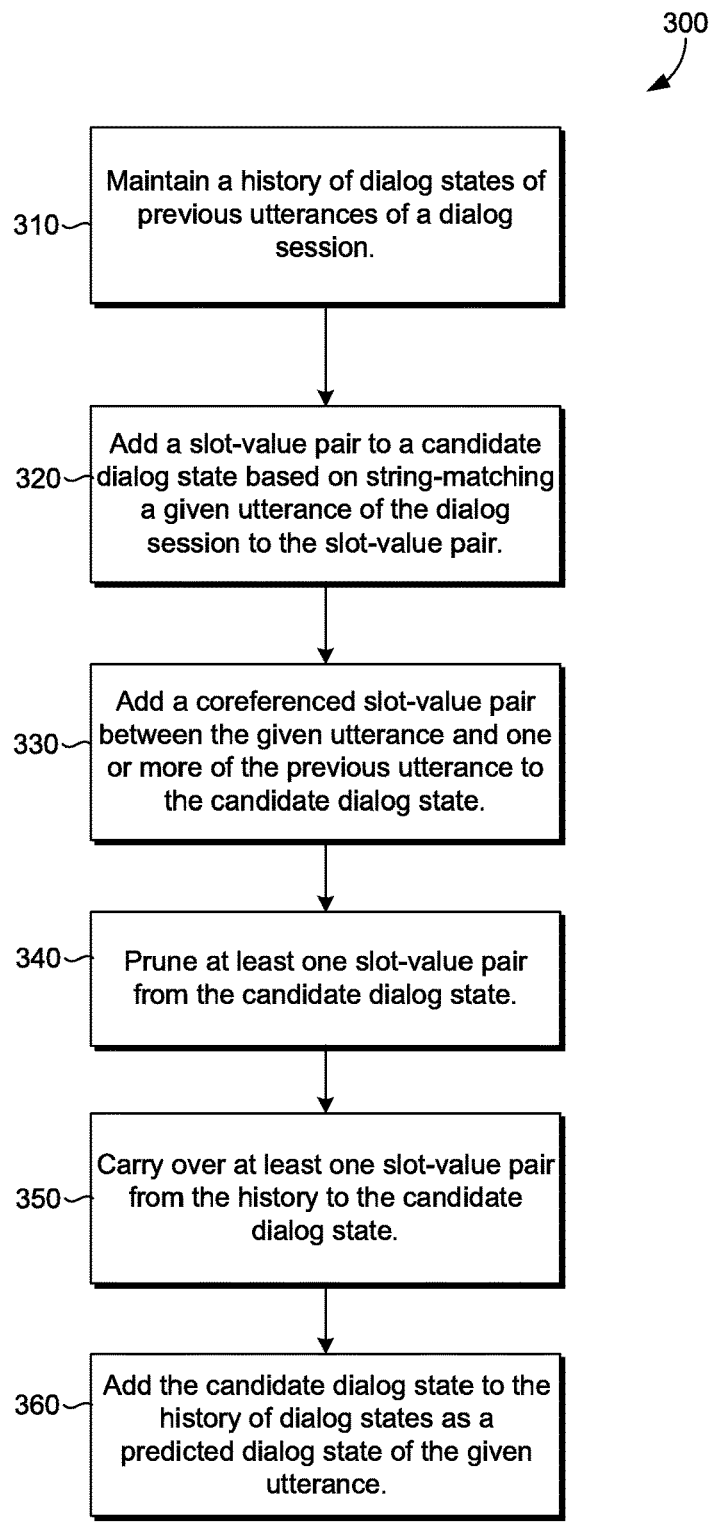
FIG. 3 is a flow diagram showing a method predicting dialog states of dialog sessions in accordance with embodiments of the present disclosure.

Referring now to FIG. 3, a flow diagram is provided showing an embodiment of a method 300 for predicting dialog states of dialog session. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 310, method 300 includes maintaining a history of dialog states of previous utterances of a dialog session. For example, session manager 122 can maintain history of states 134. Each dialog state in history of states 134 includes a set of slot-value pairs that is assigned to an utterance of utterances 132 of dialog session 130.

At block 320, method 300 includes adding a slot-value pair to a candidate dialog state based on string-matching a given utterance of the dialog session to the slot-value pair. Session manager 122 can provide a current utterance to dialog state tracker 118, which can attempt to predict a dialog state of the given utterance. String-matcher 150 can add a plurality of slot-value pairs from ontology 124 to candidate dialog state 140 of the given utterance of dialog session 130. The adding can be based on, for each value in the plurality slot-value pairs, determining a match between a string that represents the value and a sub-string of the given utterance. In some implementations, the string that represents the value is a synonym to the value.

At block 330, method 300 includes adding a coreferenced slot-value pair between the given utterance and one or more of the previous utterance to the candidate dialog state. For example, coreference resolver 154 can add a coreferenced slot-value pair to candidate dialog state 140 based on matching one or more sub-strings of the given utterance to the coreferenced slot-value pair identified in history of dialog states 134 for one or more of utterances 132 that occur prior to the given utterance in dialog session 130.

At block 340, method 300 includes removing at least one slot-value pair from the candidate dialog state. For example, slot-value pruner 152 can remove at least one slot-value pair from candidate dialog state 140. This can include merging slot-value pairs that are in candidate dialog state 140 into another slot-value pair from ontology 124.

At block 350, method 300 includes carrying over at least one slot-value pair from the history of dialog state to the candidate dialog state. For example, carryover component 156 can carry over a slot-value pair from one or more of the dialog states in history of states 134.

At block 360, method 300 includes adding the candidate dialog state to the history of dialog states as a predicted dialog state of the given utterance. For example, session manager 122 can receive the candidate dialog state from dialog state tracker 118 as the predicted dialog state of the given utterance. Session manager 122 can assign the predicted dialog state to current state 136 and include it in history of states 134. Session manager 122 may also provide current state 136 to output renderer 112, which performs some action based on the slot-value pairs that are in current state 136. A user may provide an utterance to dialog system 106 (e.g., subsequent to the action) as part of dialog session 130. In response, session manager 122 may utilize this utterance as the given utterance and method 300 can repeat. In this example, this pattern can repeat for each utterance received in dialog session 130.

Figures 4, 5:
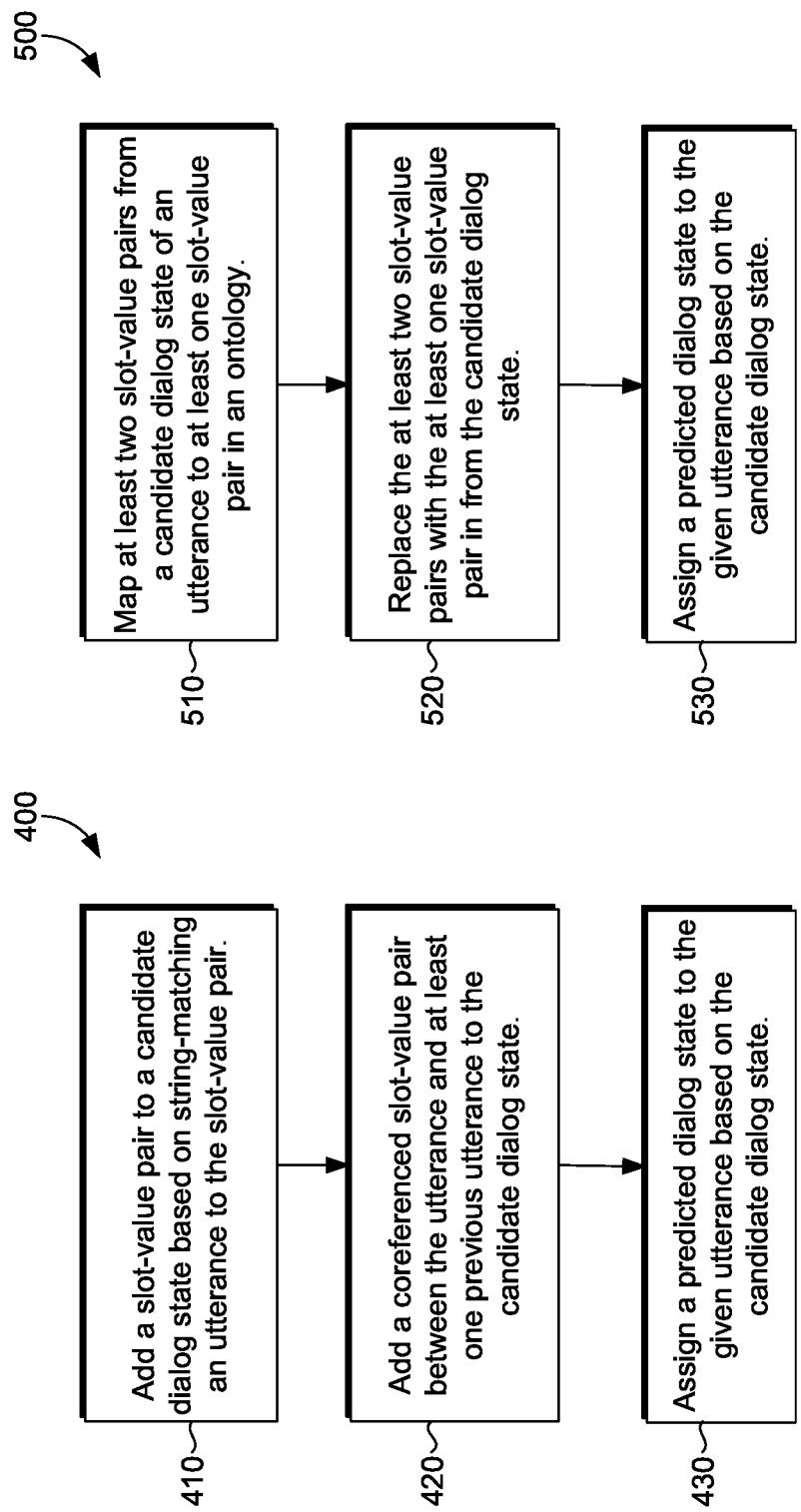
FIG. 4 is a flow diagram showing a method predicting dialog states of dialog sessions in accordance with embodiments of the present disclosure.
FIG. 5 is a flow diagram showing a method predicting dialog states of dialog sessions in accordance with embodiments of the present disclosure.

Referring now to FIG. 4, a flow diagram is provided showing one embodiment of a method 400 for predicting dialog states of utterances. At block 410, method 400 includes adding a slot-value pair to a candidate dialog state based on string-matching an utterance to the slot-value pair. For example, string-matcher 150 can string-match substrings of the utterance to strings representing synonyms of values in ontology 124 and add any matching slot-value pairs to candidate dialog state 140.

At block 420, method 500 includes adding a coreferenced slot-value pair between the utterance and at least one previous utterance to the candidate dialog state. For example, coreference resolver 154 can add a coreferenced slot-value pair to candidate dialog state 140 based on identifying a coreference between the utterance and a previous utterance. Coreference resolver 154 can identify the coreferenced slot-value pair for the adding from the dialog state of the previous utterance in history of states 134.

At block 430, method 500 includes assigning a predicted dialog state to the given utterance based on the candidate dialog state. For example, dialog state tracker 118 can assign candidate dialog state 140 as the predicted dialog state. As another example, candidate dialog state 140 could be used as a feature in a fuzzy matching algorithm used to generate the predicted dialog state.

Referring now to FIG. 5, a flow diagram is provided showing one embodiment of a method 500 for predicting dialog states of utterances. At block 510, method 500 includes mapping at least two slot-value pairs from a candidate dialog state of an utterance to at least one slot-value pair in an ontology. For example, slot-value pruner 152 can map slot-value pairs in candidate dialog state 140 to one or more slot-value pairs in ontology 124.

At block 520, method 500 includes replacing the at least two slot-value pairs with the at least one slot-value pair in from the candidate dialog state. For example, based on successfully mapping the slot-value pairs, slot-value pruner 152 can replaces those slot-value pairs with the one or more slot-value pairs from the ontology in candidate dialog state 140.

At block 530, method 500 includes assigning a predicted dialog state to the given utterance based on the candidate dialog state. For example, dialog state tracker 118 can assign candidate dialog state 140 as the predicted dialog state. As another example, candidate dialog state 140 could be used as a feature in a fuzzy matching algorithm used to generate the predicted dialog state.

Figure 6:
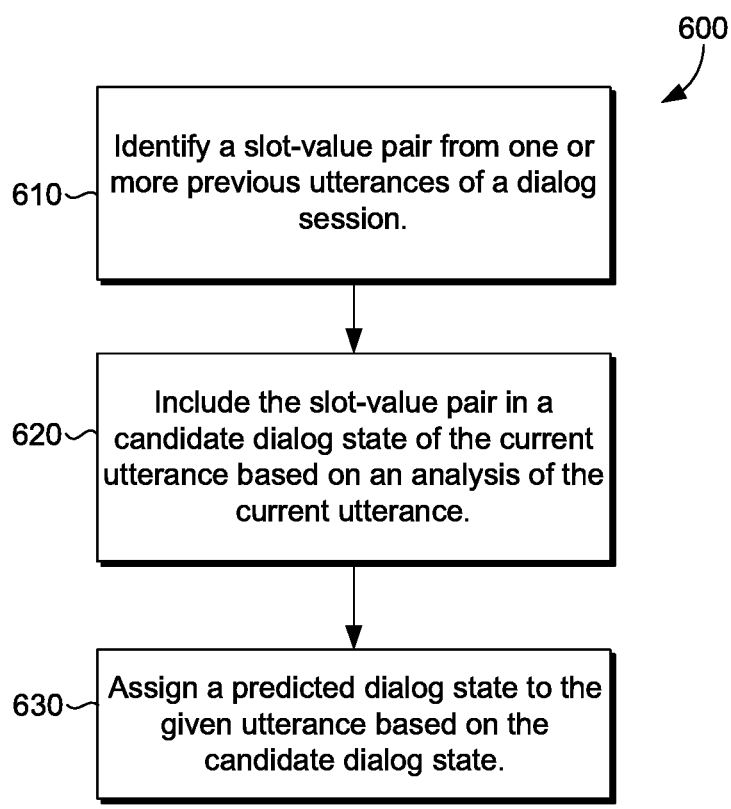
FIG. 6 is a flow diagram showing a method predicting dialog states of dialog sessions in accordance with embodiments of the present disclosure.

Referring now to FIG. 6, a flow diagram is provided showing one embodiment of a method 600 for predicting dialog states of utterances. At block 610, method 600 includes identifying a slot-value pair from one or more previous utterances of a dialog session. For example, carryover component 156 can identify a slot-value pair in history of states 134. This can be based on the number of utterances between a given utterance and the utterance from which the slot-value pair is identified. This can further be based on the slot of the slot-value pair.

At block 620, method 600 includes including the slot-value pair in a candidate dialog state of the current utterance based on an analysis of the current utterance. For example, carryover component 156 can include the slot-value pair in candidate dialog state 140. In some cases, the slot-value pair is not included when carryover component 156 identifies a slot-value pair in candidate dialog state 140 having the same slot and different value as the slot-value pair.

At block 630, method 600 includes assigning a predicted dialog state to the given utterance based on the candidate dialog state. For example, dialog state tracker 118 can assign candidate dialog state 140 as the predicted dialog state. As another example, candidate dialog state 140 could be used as a feature in a fuzzy matching algorithm used to generate the predicted dialog state.

Figure 7:
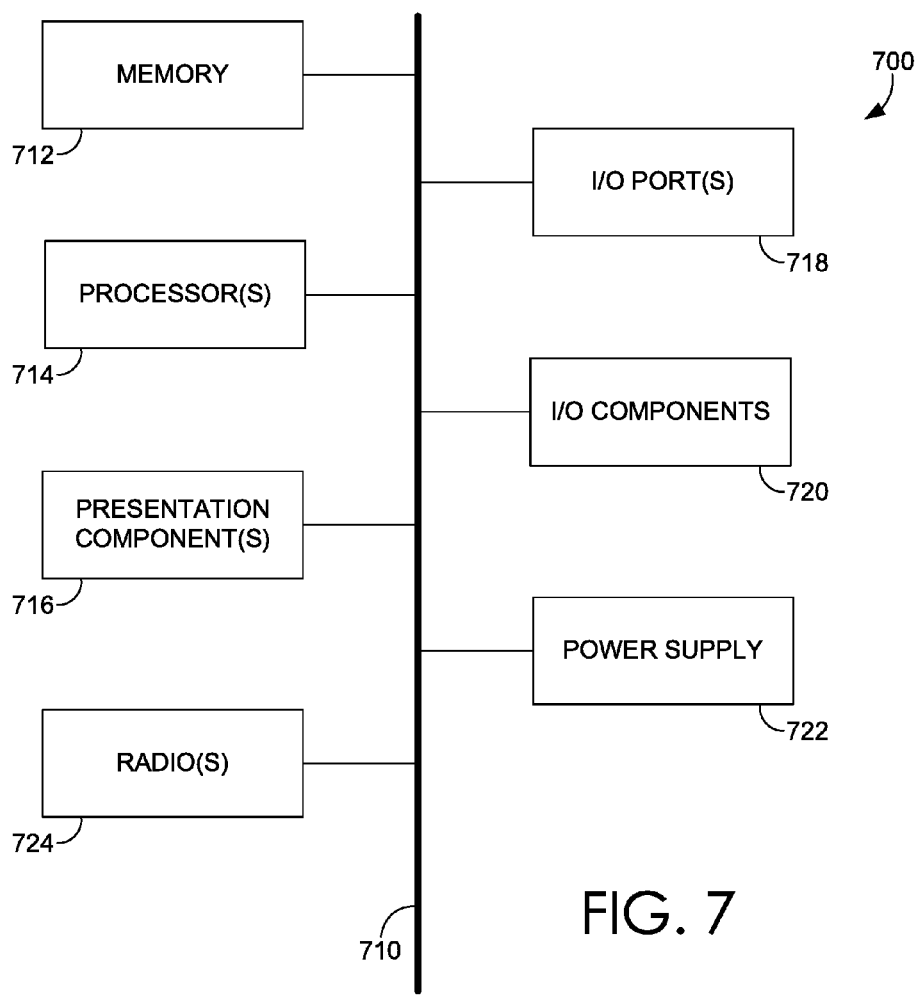
FIG. 7 is a block diagram of an exemplary computing environment suitable for use in implementations of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for recommending service content items using virtual tiles. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented system for determining dialog states of utterances, the system comprising:
   one or more processors and memory, coupled with the one or more processors, having executable instructions embodied thereon, which, when executed by the one or more processors cause the one or more processors to perform operations comprising:
   maintaining a history of predicted dialog states, each predicted dialog state in the history comprising a set of slot-value pairs assigned to an utterance of a plurality of utterances of a dialog session;
   string-matching a plurality of slot-value pairs of an ontology to a given utterance of the dialog session to identify the plurality of slot-value pairs associated with the utterance, said string-matching including, for each slot-value pair:
   determining a failed match between a string that represents a value of the slot-value pair and a sub-string of the given utterance;
   based on the determining the failed match, identifying a synonym of the value; and
   determining a successful match between a string that represents the synonym of the value of the slot-value pair and the sub-string of the given utterance to identify the synonym in the utterance;
   adding the identified plurality of slot-value pairs to a candidate dialog state of the given utterance based on the successful match for the slot-value pair, wherein the candidate dialog state comprises a candidate set of slot-value pairs assigned to the given utterance;
   removing at least one slot-value pair from the candidate dialog state;
   designating the candidate dialog state as the predicted dialog state of the given utterance in the history; and
   outputting a response to the given utterance to a user device of a user associated with the given utterance based on the predicted dialog state.

2. The computer-implemented system of claim 1, wherein for each slot-slot value pair, the synonym is selected from a list of synonyms assigned to the value.

3. The computer-implemented system of claim 1, further comprising:
   matching one or more sub-strings of the given utterance to a template that specifies a type of coreferenced slot-value pair in the ontology; and
   adding the coreferenced slot-value pair to the candidate set of slot-value pairs of the candidate dialog state based on determining that the coreferenced slot-value pair matches the type specified by the template.

4. The computer-implemented method of claim 1, further comprising determining that a historic slot-value pair is present in the set of slot-value pairs for at least one utterance that occurs prior to the given utterance in the dialog session; and adding the historic slot-value pair to the predicted dialog state of the given utterance based on the determining.

5. A computer-implemented method for determining dialog states of utterances comprising:

receiving a given utterance of a dialog session, the given utterance represented as computer readable text;

identifying a sub-string of the computer readable text for string-matching to a slot-value pair of an ontology;

determining, by the string-matching, a successful match between the sub-string and a string that represents a synonym of a value of the slot-value pair to identify the slot-value pair associated with the utterance by identifying the synonym in the utterance;

adding the slot-value pair to a candidate dialog state of the given utterance based on the successful match, wherein the candidate dialog state comprises a candidate set of slot-value pairs assigned to the given utterance;

assigning a predicted dialog state to the given utterance in a history of dialog states of the dialog session based on the candidate dialog state; and outputting a response to the given utterance to a user device of a user associated with the given utterance based on the predicted dialog state.

6. The computer-implemented method of claim 5, wherein the string-matching comprises:

identifying an initial synonym of the value;

determining a failed match between the sub-string and an initial string that represents the initial synonym and; and based on the determining of the failed match, attempting the determining using the string that represents the synonym.

7. The computer-implemented method of claim 5, wherein the string-matching comprises:

selecting the synonym of the value from a list of synonyms assigned to the value;

based on the selecting of the synonym, using the string in the determining the successful match.

8. The computer-implemented method of claim 5, wherein the synonym corresponds to a plurality of words and the string-matching comprises:

determining a failed match between the sub-string of the given utterance and an initial string that represents a first sequence of the words; and performing the determining of the successful match using the string, wherein the string represents a second sequence of the words of the synonym.

9. The computer-implemented method of claim 5, wherein the string-matching comprises:

selecting the synonym of the value from a list of synonyms assigned to the value, the list indicating a part-of-speech of the synonym;

wherein the determining of the successful match includes based on the selecting of the synonym, determining that the part-of-speech of the synonym matches a part-of-speech corresponding to the sub-string.

10. The computer-implemented method of claim 5, further comprising, based on an analysis of the ontology:

enforcing part-of-speech matching in the string-matching for a first of a plurality of slot-value pairs; and refraining from enforcing part-of-speech matching in the string-matching for a second of the plurality of slot-value pairs.

11. The computer-implemented method of claim 5, further comprising:

determining a match between a first string that represents a value of a given slot-value pair and a sub-string of a second string that represents another slot-value pair that is in the candidate set of slot-value pairs of the candidate dialog state;

refraining from including the given slot-value pair in a second set of slot-value pairs assigned to the predicted dialog state of the given utterance based on the determining of the match.

12. The computer-implemented method of claim 5, further comprising:

matching one or more sub-strings to a template that specifies a type of coreferenced slot-value pair in the ontology; and adding the coreferenced slot-value pair to the candidate dialog state based on determining that the coreferenced slot-value pair matches the type specified by the template.

13. The computer-implemented method of claim 5, further comprising determining that a historic slot-value pair is present in the history of dialog states for at least one utterance that occurs prior to the given utterance in the dialog session; and adding the historic slot-value pair to the predicted dialog state of the given utterance based on the determining.

14. The computer-implemented method of claim 5, further comprising:

identifying a historic slot-value pair in the history of dialog states for at least one utterance that occurs prior to the given utterance in the dialog session;

determining the identified historic slot-value pair has a same slot as an existing slot-value pair in the candidate dialog state and a different value than the existing slot-value pair;

based on the determining of the identified historic slot-value pair, refraining from including the historic slot-value pair in the predicted dialog state of the given utterance.

15. The computer-implemented method of claim 5, further comprising:

determining at least two slot-value pairs in the candidate dialog state correspond to a merged slot-value pair in the ontology;

based on the determining of the at least two slot-value pairs, adding the merged slot-value pair to the candidate dialog state and removing the at least two of the slot-value pairs from the candidate dialog state.

16. The computer-implemented method of claim 5, comprising determining the predicted dialog state of the given utterance using a fuzzy matching algorithm that uses the candidate dialog state to generate a feature of the fuzzy matching algorithm to select slot-value pairs for the predicted dialog state.

17. One or more non-transitory computer-readable media having a plurality of executable instructions embodied thereon, which, when executed by one or more processors, cause the one or more processors to perform a method for determining dialog states of utterances, the method comprising:

string-matching a plurality of slot-value pairs of an ontology to a given utterance of a dialog session to identify the plurality of slot-value pairs associated with the utterance by, for each slot-value pair determining a successful match between a string that represents a synonym of the value of the slot-value pair and a sub-string of the given utterance to identify the synonym in the utterance;

adding the identified plurality of slot-value pairs to a candidate dialog state of the given utterance based on the successful match for the slot-value pair, wherein the candidate dialog state comprises a candidate set of slot-value pairs assigned to the given utterance;

identifying a coreference between the given utterance and one or more previous utterances of the dialog session;

adding a coreferenced slot-value pair identified in the one or more previous utterances to the candidate dialog state based on the identifying of the coreference;

assigning a predicted dialog state to the given utterance in a history of dialog states of the dialog session based on the candidate dialog state; and outputting a response to the given utterance to a user device of a user associated with the given utterance based on the predicted dialog state.

18. The one or more non-transitory computer-readable media of claim 17, wherein the adding of the coreferenced slot-value pair comprises:

matching one or more sub-strings of the given utterance to a template that specifies a type of coreferenced slot-value pair; and performing the adding based on determining that the coreferenced slot-value pair matches the type specified by the template.

19. The one or more non-transitory computer-readable media of claim 17, wherein the identifying the coreference comprises:

matching one or more sub-strings of the given utterance to a template that specifies at least one part-of-speech of the one or more sub-strings that is required for the matching of the given sub-string to occur; and matching the coreferenced slot-value pair to a type of coreferenced slot value pair that the template specifies is required of the coreferenced slot-value pair for the matching to occur;

wherein the adding of the coreferenced slot-value pair is based on the matching of the given sub-string and the matching of the coreferenced slot-value pair.

* * * * *